(12) United States Patent
Hardin

(10) Patent No.: US 12,435,786 B2
(45) Date of Patent: Oct. 7, 2025

(54) METHODS AND SYSTEMS FOR IMPROVING THE OPERATION OF TRANSMISSIONS FOR MOTOR VEHICLES

(71) Applicant: David A. Hardin, El Monte, CA (US)

(72) Inventor: David A. Hardin, El Monte, CA (US)

(73) Assignee: Transgo, LLC, El Monte, CA (US)

(*) Notice: Subject to any disclaimer, the term of this patent is extended or adjusted under 35 U.S.C. 154(b) by 935 days.

(21) Appl. No.: 17/577,491

(22) Filed: Jan. 18, 2022

(65) Prior Publication Data
US 2023/0228303 A1    Jul. 20, 2023

(51) Int. Cl.
*F16H 61/00* (2006.01)
*F16D 48/02* (2006.01)
(Continued)

(52) U.S. Cl.
CPC ......... *F16H 61/0021* (2013.01); *F16D 48/02* (2013.01); *F16H 61/00* (2013.01); *F16H 61/0206* (2013.01); *F16H 61/0267* (2013.01); *F16K 15/044* (2013.01); *F16D 2048/0221* (2013.01); *F16D 2048/0263* (2013.01); *F16D 2500/1027* (2013.01); *F16H 2061/0062* (2013.01)

(58) Field of Classification Search
CPC ......... F16H 2061/0062; F16H 61/0021; F16H 61/0206; F16H 61/0267; F16H 2061/0253; F16D 2048/0209; F16D 2048/0221; F16D 48/02
See application file for complete search history.

(56) References Cited

U.S. PATENT DOCUMENTS

| | | | |
|---|---|---|---|
| 4,449,426 A | 5/1984 | Younger |
| 4,711,140 A | 12/1987 | Younger |
| (Continued) | | | |

*Primary Examiner* — Atif H Chaudry
(74) *Attorney, Agent, or Firm* — Mark P. Stone

(57) ABSTRACT

The hydraulic circuitry of a factory installed automatic automotive transmission is modified to include a check ball and spring to limit balance oil to a predetermined pressure applied to first end of the clutch regulator valve. When the onboard automobile computer ramps up solenoid oil pressure applied to the clutch regulator valve through a gain valve that acts on a first end of the clutch regulator valve, this pressure is opposed by a spring as well as clutch balance oil pressure that is routed and applied to a second opposite end of the clutch regulator valve. The arrangement limits the balance oil pressure applied to the second end of the clutch regulator valve to a predetermined maximum value so the onboard computer regulates the clutch up to that predetermined value. When the pressure/force applied to the second end of the clutch regulator valve exceeds the predetermined maximum value, a check ball disposed at the second end of the clutch regulator valve, held in place by a spring, is displaced and unseated from a seat in a valve bore, resulting in the exhaust or leaking of the balance oil applied to the second end of the clutch regulator valve so that the oil pressure applied to the first end of the clutch regulator valve is no longer opposed by the balance oil applied to the second end of the clutch regulator valve, thereby enabling the clutch regulator valve to quickly move in a direction to complete the shift and to hold added engine power during the shift.

3 Claims, 3 Drawing Sheets

(51) Int. Cl.
  *F16H 61/02* (2006.01)
  *F16K 15/04* (2006.01)

(56) References Cited

U.S. PATENT DOCUMENTS

| | | |
|---|---|---|
| 4,790,938 A | 12/1988 | Younger |
| 5,253,549 A | 10/1993 | Younger |
| 5,540,628 A | 7/1996 | Younger |
| 5,624,342 A | 4/1997 | Younger |
| 5,730,685 A | 3/1998 | Younger |
| 5,743,823 A | 4/1998 | Younger |
| 5,768,953 A | 6/1998 | Younger |
| 5,820,507 A | 10/1998 | Younger |
| 5,967,928 A | 10/1999 | Younger |
| 6,099,429 A | 8/2000 | Younger |
| 6,117,047 A | 9/2000 | Younger |
| 6,287,231 B1 | 9/2001 | Younger |
| 6,390,944 B1 | 5/2002 | Younger |
| 6,565,472 B1 | 5/2003 | Younger |
| 6,699,157 B2 | 3/2004 | Younger |
| 6,729,989 B2 | 5/2004 | Younger |
| 6,814,680 B2 | 11/2004 | Younger |
| 6,871,397 B2 | 3/2005 | Younger |
| 6,913,554 B2 | 7/2005 | Younger |
| 6,964,628 B2 | 11/2005 | Younger |
| 7,128,679 B2 | 10/2006 | Younger |
| 7,331,893 B2 | 2/2008 | Younger |
| 9,429,228 B2 | 8/2016 | Younger |
| 9,970,534 B2 | 5/2018 | Younger |
| 10,724,628 B2 | 7/2020 | Hardin |
| 10,948,059 B2 | 3/2021 | Hardin |
| 11,105,415 B2 | 8/2021 | Hardin |
| 2003/0188946 A1* | 10/2003 | Jackson ............... F16H 61/143 |
| | | 192/3.29 |
| 2005/0272549 A1* | 12/2005 | Carne .................... F16H 57/04 |
| | | 475/116 |

* cited by examiner

METHODS AND SYSTEMS FOR IMPROVING THE OPERATION OF TRANSMISSIONS FOR MOTOR VEHICLES

BACKGROUND OF THE INVENTION

The methods and systems of the present invention are directed to the modification and improvement of automatic transmissions for automotive vehicles, more commonly referred to as "factory installed" transmissions, installed in automotive vehicles by an original motor vehicle manufacturer. The invention is more particularly directed to improvements to the "factory installed" hydraulic circuitry of automotive transmissions designated as 6L80 installed in vehicles manufactured by General Motors Corporation of Detroit, Michigan.

Operation of the aforementioned "factory installed" automatic automotive transmission is well known to and within the knowledge of persons skilled in the relevant art of automotive transmission operation and design. Descriptions and illustrations of this "factory installed" automotive transmissions are found in a publication of the General Motors Corporation identified as "HYDRA-MATIC 6 Speed RWD Technician's Guide", the entire subject matter of which is hereby expressly incorporated by reference herein.

The 2-6 clutch regulator valve of the 6L80 factory installed transmission is controlled by the vehicle's onboard computer to apply and release the 2-6 clutch during the 1-2 and the 5-6 up shifts. Oil pressure applied to one end of the valve is opposed by balance oil pressure and the resilient force of a spring applied to the other end of the valve to slowly move the valve in a first direction, thereby slowing the time needed to complete a shift. When adding horse power to the engine, the apply time of the clutch regulator valve is too slow at raising the 2-6 clutch pressure to hold the increase in engine power.

It is the primary object of the present invention to modify the hydraulic circuitry of the factory installed transmission to decrease the time required for the clutch regulator valve to complete a shift thereby enabling the automotive engine to hold or maintain increased engine power.

SUMMARY OF THE INVENTION

In accordance with the present invention, the hydraulic circuitry of the factory installed automotive automatic transmission such as the General Motors Transmission 6L80 is modified to include a check ball and spring to limit balance oil to a predetermined pressure, preferably 42 psi (pounds per square inch), applied to one end of the 2-6 clutch regulator valve. When the onboard automobile computer ramps up solenoid oil pressure applied to a 2-6 gain valve that acts on a first end of the 2-6 clutch regulator valve, this pressure is opposed by a spring as well as 2-6 clutch balance oil pressure that is routed and applied to a second opposite end of the 2-6 clutch regulator valve. The arrangement limits the balance oil pressure applied to the second end of the 2-6 clutch regulator valve to a predetermined value, preferably 42 psi, so the onboard computer regulates the 2-6 clutch up to 42 psi. When the pressure/force applied to the second end of the clutch regulator valve exceeds the predetermined value, a check ball disposed at the second end of the clutch regulator valve, held in place in a seat defined in the valve bore by a spring, is displaced and unseated, resulting in the exhaust or leaking of the balance oil applied to the second end of the clutch regulator valve so that the oil pressure applied to the first end of the 2-6 clutch regulator valve is no longer opposed by the balance oil applied to the second end of the clutch regulator valve, thereby enabling the clutch regulator valve to quickly move in a direction to complete the shift and to hold added engine power during the shift.

BEST MODE FOR CARRYING OUT THE INVENTION

Figure 1:
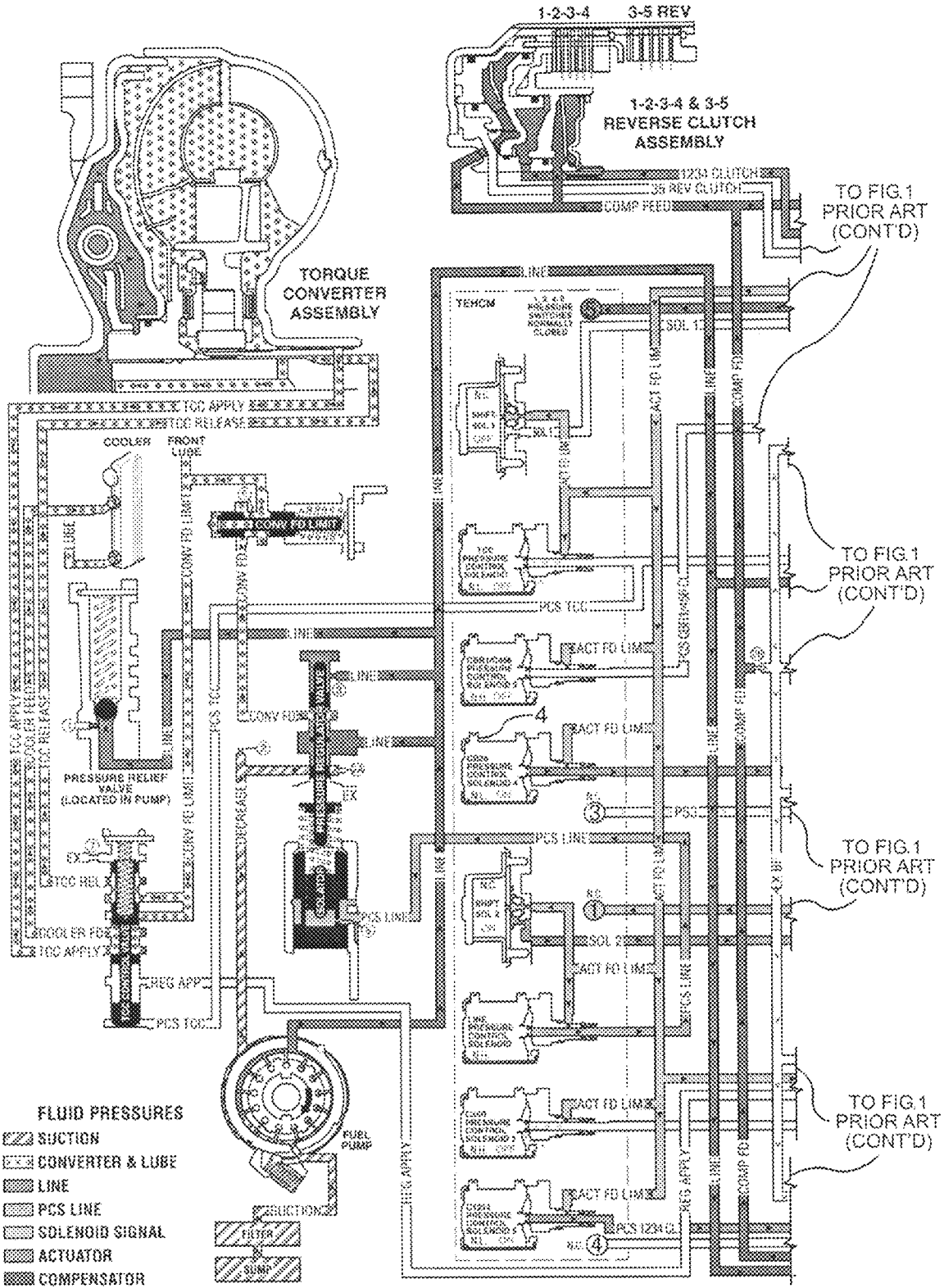
FIG. 1 illustrates the hydraulic circuit of a "factory installed" 6L80 automotive transmission installed in vehicles manufactured by General Motors Corporation of Detroit, Michigan.
Figure 1:
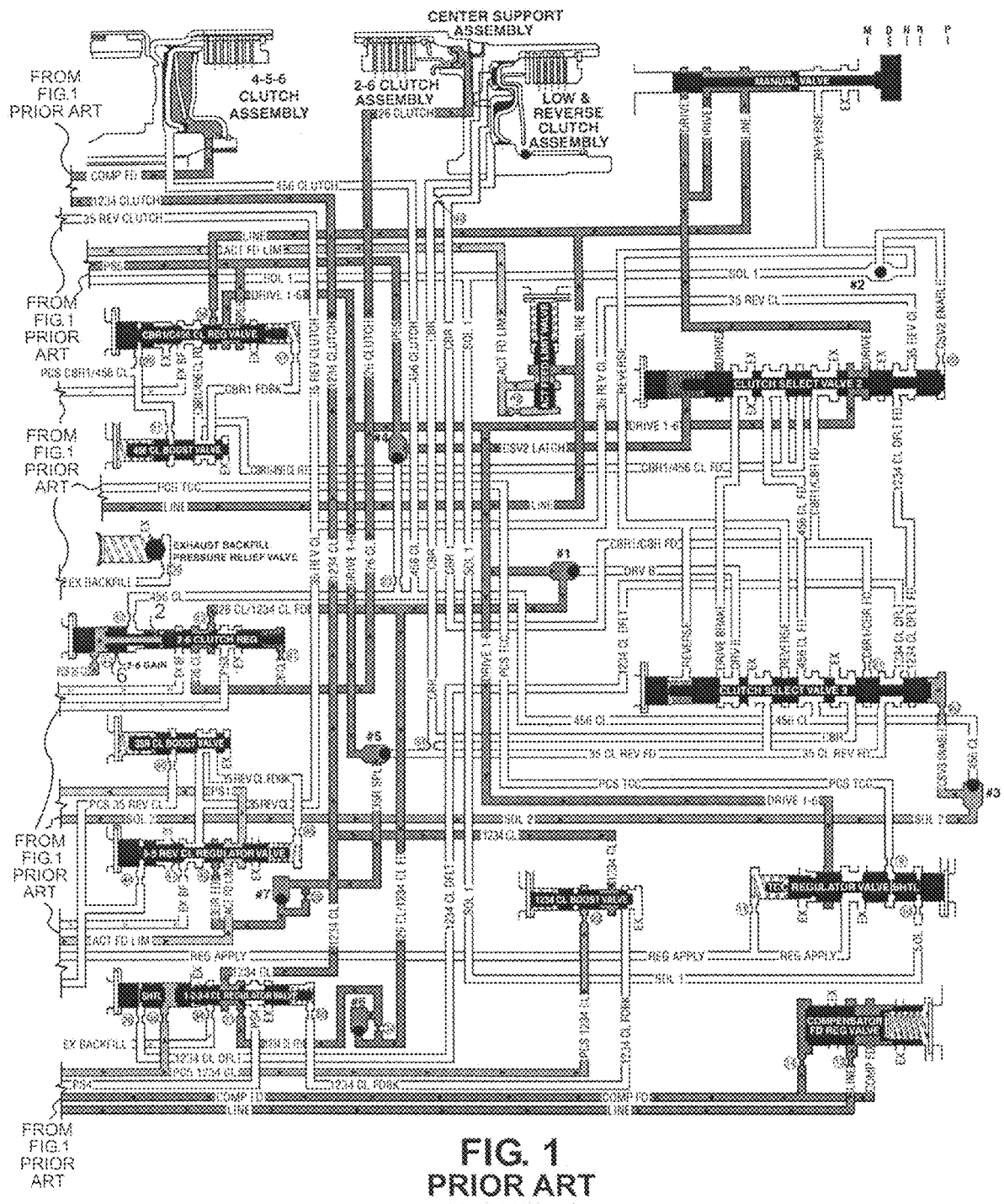

Referring to FIG. 1 of the drawing, the "factory installed" 6L80 General Motors automotive transmission includes a 2-6 clutch regulator valve designated by reference mineral 2 which is controlled b an onboard computer through a solenoid designated by reference numeral 4. When the onboard computer acts on the solenoid 4, oil pressure is applied to a 2-6 gain valve designated by reference numeral 6 which applies the oil pressure to the left end of the 2-6 clutch regulator valve as shown in the drawing to move the 2-6 clutch regulator valve 2-6 in a rightward direction. This rightward movement is opposed by the resilient force of a "factory installed" spring on the right side of the 2-6 clutch regulator valve as well as clutch oil applied to the right side of the clutch regulator valve, both of which oppose movement of the 2-6 regulator valve in a rightward direction as shown in the drawing. This arrangement tends to cause a slow shift of the 2-6 clutch regulator valve to between about 1.2-1.4 seconds.

Figure 2:
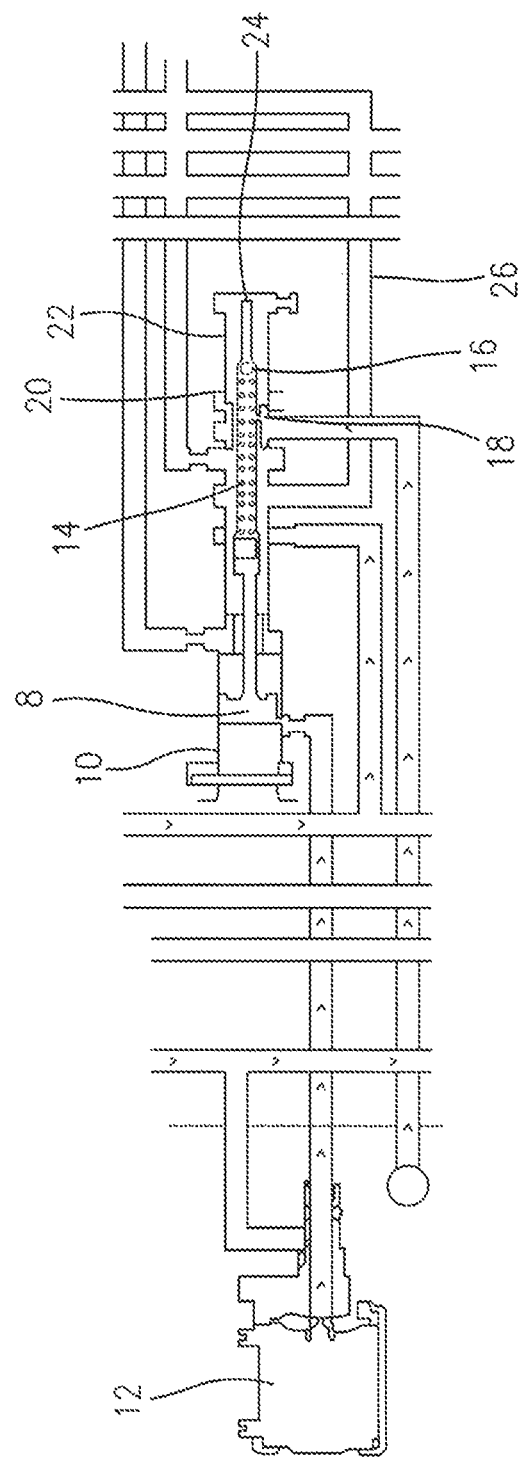
FIG. 2 is an isolated view of a portion of the hydraulic circuitry shown by FIG. 1 illustrating the modifications to the hydraulic circuit illustrated by FIG. 1 in accordance with the present invention.

FIG. 2 of the drawing illustrates the modification made to the "factory installed" hydraulic circuit illustrated by FIG. 1.

Referring to FIG. 2, the 2-6 clutch regulator valve 8 is controlled by an onboard computer through a solenoid 12 and a 2-6 gain valve 10, similar to that of the "factory installed" transmission illustrated by FIG. 1. However, the modification to the "factory installed" hydraulic circuit provides a new spring 14 arranged at the right end of the clutch regulator valve 8 as well as a check ball 16 arranged to the right of the spring 14 and seated in a seat 20 defined by an inwardly tapered portion of a valve housing or valve bore 22. The force of the spring 14 maintains the check ball 16 seated in the seat 20. A plug 24 is provided at the right end of the valve housing 22 to maintain the spring 14 and check hall 16 in a predetermined arrangement as shown in FIG. 2.

In operation, an onboard computer controls the solenoid 12 which applies oil pressure to the left end of the 2-6 clutch regulator valve 8 through the 2-6 gain valve 10, tending to move the clutch regulator valve in a rightward direction, as shown in the drawing. The spring 14 applies a resilient force to the right end of the clutch regulator tending to move this valve in a leftward direction in opposition to the oil pressure applied to the left end of the valve. Additionally, balance oil pressure is also applied to the right end of the clutch regulator valve through line 26 to supplement the resilient force applied to the right end of the clutch regulator valve b the spring 14.

The characteristic of the spring 14, and the application of the balance oil pressure applied to the right end of the clutch regulator valve 8 through the line 26, are selected such that, the pressure applied to the right side of the clutch regulator valve does not exceed a predetermined pressure, preferably 42 psi, as will be described below.

In operation, when the balance oil pressure applied to the right side of the clutch regulator valve through the line 26 exceeds a predetermined pressure (e.g., 42 psi), the spring 14 is moved a sufficient distance to the left to displace and unseat the check ball 16 from its seat 20. This allows balance oil applied to the right end of the clutch regulator valve to leak or exhaust through an exhaust 18 in the valve housing 22, thereby allowing the clutch regulator valve to quickly move to the right because the oil pressure applied to the left end of the clutch regulator valve is no longer opposed by the balance oil pressure applied to the right end of the clutch regulator valve. Additionally, the characteristic of the spring 14 is selected to be more resilient than that of the "factory installed" spring so that the force applied by the spring to the right end of the clutch regulator valve is less than that applied to the right end of the clutch regulator valve of the "factory installed" transmission, thereby allowing the clutch regulator valve to more quickly move to the right to complete the shift.

Accordingly, the structural arrangement of the spring 14 and the check ball 16 and the seat 20 enable the clutch regulator valve to move to the right and complete the shift faster than that of the "factory installed" transmission. Preferably, the modification to the hydraulic circuitry in accordance with the present invention reduces the shift time to between about 0.2-0.3 seconds.

In summary, the modification to the hydraulic circuit of the "factor installed" automatic automotive transmission decreases the time necessary to complete a 2-6 clutch regulator valve shill enabling the transmission to hold n increase in engine power by providing the necessary structure to limit the balance oil pressure applied to right end of the clutch regulator valve to a predetermined pressure by exhausting the balance oil when the predetermined balance oil pressure is attained, thereby allowing oil pressure applied to the left end of the clutch regulator valve to exceed the opposing balance oil pressure and resilient force of the spring applied to the right end of the clutch regulator valve to allow the clutch regulator valve to move quickly to the right to complete the shift in less time than that of the unmodified "factory installed" transmission.

The invention claimed is:

1. A method of modifying a factory installed automotive transmission having a clutch regulator valve, means for applying oil pressure to a first end of said clutch regulator valve to move said clutch regulator valve in a first direction, means for applying oil pressure to a second end of said clutch regulator valve to move said clutch regulator valve in a second direction opposite to said first direction, and a factory installed spring for applying a resilient force to the second end of the clutch regulator valve, said factory installed automotive transmission arranged to complete a shift of the clutch regulator valve in a predetermined time range, the steps of said method including:
  limiting the oil pressure applied to the second end of said clutch regulator valve to a predetermined maximum oil pressure for reducing the time for completing a shift by:
  replacing the factory installed spring with a replacement spring, providing a check ball seated in a check ball seat proximate to said second end of said clutch regulator valve, arranging said replacement spring to cooperate with said check ball to maintain said check ball seated in said check ball seat when the oil pressure applied to said second end of said clutch regulator valve does not exceed said predetermined maximum oil pressure, selecting said replacement spring having a spring characteristic to move a sufficient distance in said second direction for unseating said check ball from said check ball seat when the oil pressure applied to the second end of said clutch regulator valve exceeds said predetermined maximum oil pressure, and exhausting oil applied to said second end of said clutch regulator valve when the oil pressure applied thereto exceeds said predetermined maximum oil pressure, wherein the time range for completing a shift by said clutch regulator valve is less than the predetermined time range for completing a shift of the clutch regulator valve of said factory installed automotive transmission.

2. The method as claimed in claim 1, including the further step of controlling the oil pressure applied to the first end of the clutch regulator valve by an onboard vehicle computer.

3. The method as claimed in claim 2, wherein the oil pressure applied to the second end of the clutch regulator valve is balance oil supplied through a line in fluid communication with a clutch assembly.

* * * * *